United States Patent [19]

Shea

[11] 4,107,127
[45] Aug. 15, 1978

[54] FIRE-RESISTANT SYNTHETIC RESIN COMPOSITION AND METHOD

[76] Inventor: Lawrence E. Shea, 165 Lake Dr., San Bruno, Calif. 94066

[21] Appl. No.: 792,402

[22] Filed: Apr. 29, 1977

Related U.S. Application Data

[63] Continuation-in-part of Ser. No. 721,069, Sep. 7, 1976, abandoned, which is a continuation-in-part of Ser. No. 691,290, Jun. 1, 1976, Pat. No. 4,053,447, which is a continuation-in-part of Ser. No. 492,881, Jul. 29, 1974, abandoned.

[51] Int. Cl.$^2$ ............................................. C08L 61/06
[52] U.S. Cl. ..................................... 260/38; 260/17.2; 528/129; 528/155; 528/156; 528/165
[58] Field of Search .................................. 260/38, 54

[56] References Cited
U.S. PATENT DOCUMENTS

| | | | |
|---|---|---|---|
| 2,489,336 | 11/1949 | Spahr et al. | 260/54 |
| 3,328,354 | 6/1967 | Dietrick | 260/54 |
| 3,919,151 | 11/1975 | Moult et al. | 260/54 |

OTHER PUBLICATIONS

Modern Plastics Encyclopedia, 1968 (McGraw-Hill) (N.Y.), (Sep. 1967), pp. 590-593.

Primary Examiner—Lewis T. Jacobs
Attorney, Agent, or Firm—Owen, Wickersham & Erickson

[57] ABSTRACT

A resinous product has high resistance to flame spread, low heat release, and exhibits a low smoke-developed rating when exposed to flame or to indirect or radiant heat, and is flexible, tough, free of hydraulic cement, and resistant to cracking and embrittlement upon curing. Such a product is the condensation product of resorcinol with or without included phenol, and a minor amount of paraformaldehyde and aqueous formaldehyde solution. The resorcinol starting material of this invention can also suitably be used in the form of a B-stage or partially cured resin of resorcinol-phenol-formaldehyde which is then condensed with the paraformaldehyde and, if necessary, additional formaldehyde. The product is useful as a cast material or as laminated with fiberglass or can contain fillers or the like. A method of making the product and articles is provided.

22 Claims, No Drawings

FIRE-RESISTANT SYNTHETIC RESIN COMPOSITION AND METHOD

REFERENCE TO CO-PENDING APPLICATIONS

This application is a continuation-in-part of application Ser. No. 721,069, filed Sept. 7, 1976, now abandoned, which was a continuation-in-part of my earlier-filed patent application, Ser. No. 691,290, filed June 1, 1976, now U.S. Pat. No. 4,053,447, which was a continuation-in-part of my still earlier patent application, Ser. No. 492,881, filed July 29, 1974, now abandoned.

BACKGROUND OF THE INVENTION

This invention relates to a synthetic resin composition and to a method for its manufacture. The resin of this invention has good properties under high temperatures and remarkable resistance to flame, when exposed to either direct impingement of flame or to irradiated heat sources, producing little or no smoke. More particularly, this invention relates to polyhydric phenol-aldehyde resin systems.

The plastics industry has enjoyed tremendous growth for decades as new uses for plastic were found. The construction and aircraft industries, the marine industry, the transportation industry, and others, increasingly use plastics to replace metals, wood, ceramics, plasters, and other conventional construction materials. Many families of plastic resins have been used, including polyvinyl chlorides, polyethylenes, polypropylenes, polyester resins, melamines, and urethanes; and the resins have been combined with various filler materials such as wood flour, walnut shell flour, glass beads, ceramics, and carbon. The filled or unfilled resins have been foamed and have been combined with glass fibers, where strength characteristics were desired. Various combinations have been used to provide different characteristics, —strength, chemical resistance, corrosion resistance, aesthetic appearance, and low cost.

However, plastics have generally had a major deficiency. Plastic resins are organic compounds, some of them hydrocarbons, which are either readily flammable or produce large volumes of offensive smoke when subjected to heat or fire. As plastics have found their way into the construction industries, there has been growing discontent and disenchantment on the part of fire code authorities, fire departments, insurance companies, and those who concern themselves with public safety. In May 1973 the Federal Trade Commission spoke of possible indictment of more than two dozen large plastic resin producers for misleading the public by allegedly falsely advertising their products as fire retardant.

In prior-art practice, organic resins have sometimes been halogenated in order to increase their resistance to heat and flame. Polyvinyl chloride, for example, contains much chlorine. Certain polyester resins have also been chlorinated in order to secure resistance to high temperature and to flaming. During exposure to flame or high heat, the molecular bonds have tended to break down, releasing chlorine gas, which does function as a flame suppressant, by blanketing the available fuel of the vinyl and depriving it of oxygen. However, during the decomposition process the hydrogen in the molecular complex combines with the chlorine, forming hydrogen chloride. In the presence of moisture, whether due to high humidity (which is produced during the combustion process) or due to sprinkler systems, or due to fire fighting efforts, the resulting wet vapors of hydrochloric acid are very corrosive, eating away at building structures and other surrounding materials and producing extensive damage, while also exposing those in the vicinity of the smoke to severe potential injury. With continued combustion and exposure to high heat, the hydrogen chloride can be converted into phosgene, an exceedingly poisonous gas.

Polyester resins sometimes utilize antimony oxides, antimony tri-oxides, boron compounds, or derivatives therefrom, as a snuffing agent, however, the greater the amount of additives used to improve flame resistance, the larger the quantity of smoke that is generated.

Various resins, such as melamines, polyesters, epoxies, and urethanes, may also be filled with inert materials, such as clays, cements (e.g., alumina [aluminum hydroxide] and derivatives), asbestos, and mica, to reduce the quantity of resinous fuel available for combustion. Loadings of inert fillers often exceed 50%. High loading of inert filler materials, especially when used with halogenated resins and in combination with snuffing compounds, have been claimed to produce end products which are fire retardant. However, in actual field experience such claims have generally been shown to be ill-founded and unsupported by results.

Field experience has shown that smoke generation is as important, or more important than, intense flaming because smoke generation of plastics and attendant problems have been very serious in fires in high-rise buildings and in aircraft, for instance. Such generated smoke has made it impossible for persons to find escape exits and has resulted in suffocation and death, while impeding the work of firefighters.

Almost four-dozen tests have been used to determine flammability characteristics of plastics, but many of these have proven inadequate or even misleading and only a small handful concern determination of the smoke-generating characteristics. One of these is the ASTM E-84 test, known generally as the Steiner "Tunnel Test," and described in "Standard Method of Test for Surface Burning Characteristics of Building Materials... UL 723." Briefly, a twenty-inch wide by twenty-five-foot long sample of red oak wood is placed on the roof of a furnace which is twenty-five feet long and the wood is ignited at one end by a gas burner. The time it takes for the wood to ignite and burn the length of the furnace is the "flame spread" and is used as a reference of number 100. The amount of smoke generated is measured by a photocell and plotted on a chart, the area under the developed curve being used to determine the total quantity of smoke generated, which is also assigned an arbitrary numerical value of 100. A cement asbestos board so tested is considered as zero. Conventional plastics when so tested under standardized conditions have flame spreads which range from 10 to 1500, and their smoke developed ratings range from 200 to 2000. Experience has indicated generally that the lower the flame spread, the higher is the smoke-developed rating, progressing almost geometrically and inversely to the higher numbers.

A second test used to determine fire characteristics of materials is the Monsanto "small scale tunnel test." Instead of using a 25-foot-long test sample, the Monsannto test uses a 2-foot-long sample. It is generally conceded that the results obtained from the Monsanto tunnel test may be used to predict flame spread numbers that would be received in the "full scale" ASTM e-84 Steiner tunnel test.

A third test to determine fire characteristics of materials is that developed by the National Bureau of Standards. It has been proposed for use by the ASTM, and is identified as the "E-5" test. The National Bureau of Standards test determines results both with direct flame impingement and indirect heat irradiation. During both tests (known as "flaming" and "non-flaming") the amount of smoke generated is monitored and plotted against time. It has been found that certain materials generate very large quantities of smoke with flame impingement and little or no smoke during the non-flaming test; conversely, other materials produce little or no smoke during the flaming test, but generated large quantities of smoke during the non-flaming test. Test results of over 100 materials are contained in the National Bureau Of Standards Building Science Series Bulletin No. 18.

A fourth test useful in determining the flame and smoke characteristics of materials is in use at Ohio State University. This test was developed in recent years by Professor Edwin Smith. A test sample of less than one square foot is inserted into a test chamber. Again, the material is exposed to both a flaming and non-flaming condition. It is found that materials which contain high amounts of anti-flaming compounds often generate large volumes of dense smoke.

While there appears to be no correlation between these four tests (except between the Steiner tunnel and Monsanto tests), least of all the smoke values of the Ohio State University and the ASTM E-84 tests, any of these tests may be used conveniently to exhibit relative fire response characteristics of plastic materials: the rapidity with which flame will spread along the material's surface, the heat release rates, and the amount of smoke that will be generated by materials when exposed to a heat source.

A further problem met with plastics materials relates to their degradation when exposed to heat. Generally, thermoplastics such as polyethylene and polyvinyl chloride start to deform physically at temperatures that vary from 140° to 220° F. These materials may not therefore be utilized where high ambient temperatures are the normal operating condition. Thermosetting plastics, such as common polyesters, begin to degrade in the vicinity of 300° to 400° F. Phenolics, in combination with other materials, may remain physically stable to upwards of 500° F. All these materials are relatively low in cost and are readily available on the market; but all of them have very bad smoke generating characteristics. Certain families of materials such as polyamide-imides, when properly laminated and cured, exhibit favorable fire resisting characteristics in terms of high temperature resistance (900° F.) with little or no smoke generation; however, these raw resin materials are expensive, and polyamide-imides are expensive to fabricate.

While aldehyde resin systems of phenol and resorcinol have been known to possess high temperature strength, they have not traditionally been used in combination with fiberglass. Phenol-aldehydes, resorcinol-aldehydes, and phenol-resorcinolaldehydes link through a condensation reaction. During the condensation, large quantities of water are given off. Roughly, for every mol of phenol, a mol of water is given off. This tends to create voids in fiberglass laminates not made under high pressure and temperature conditions. A number of other problems are posed in the application of these resin systems with fiberglass. Phenol resin systems have not tended to bond well to glass. Glass fibers are usually treated with salts and chemicals such as coupling agents which make the glass more flexible and improve the bonding of the glass fibers to resins. The water of a phenol-aldehyde condensation reaction tends to react with these salts or coupling agents on the glass fibers, causing degradation and embrittlement of the glass and interferring with the coupling agents in common use. Yet it is often desirable to use fiberglass in order to achieve strength and durability. It is also desirable to be able to mold fiberglass parts without the necessity of curing the parts at high temperatures and pressures.

OBJECTS OF THE INVENTION

One object of this invention is to provide a synthetic resin system which has high resistance when exposed to flame and consequently a good "flame spread rating".

Another object of the invention is to provide a synthetic resin composition which, when exposed to a source of radiant (or indirect) heat, has little tendency toward flaming.

Another object is to provide a synthetic resin system that generates little or no smoke when exposed to a direct flame-impingement condition.

A further object is to provide a synthetic resin composition that provides little or no smoke when exposed to an indirect heat irradiation source.

Other objects of the invention are to provide a product which: resists deformation when exposed to high temperatures, has good "flame spread ratings" when exposed to a direct flaming source or when exposed to an indirect source of heat irradiation, exhibits good heat release, and has a low smoke developed rating when exposed to a flaming source or a source of radiant heat.

Additional objects of the invention are to provide a product that: has high strength, cures at room temperature, is low in cost, has a long shelf life, and is safe and easy to handle.

A further object of the invention is to provide a method of producing fire-resistant articles.

Another object is to provide a synthetic resin product of resin in combination with fiberglass which can be cured at ambient or room temperature and pressure.

A further object is to provide a filament wound product in combination with the synthetic resin composition of the invention.

SUMMARY OF THE INVENTION

I have discovered that the condensation products of resorcinol (with or without phenol as a diluent) with formaldehyde and paraformaldehyde, in alkaline state, and in the presence of water, are exceptionally fire-resistant and exceptionally low in tendency to produce smoke. The formaldehyde is present in amount sufficient to provide with the paraformaldehyde a substantially equivalent amount with respect to the phenolic hydroxy radicals available, i.e., with respect to the resorcinol or phenol-resorcinol. The resinous starting material or resorcinol component, in other words, contains or is made from 0 to 40 parts by weight phenol, 8 to 35 parts by weight resorcinol and 15 to 35 parts by weight formalin, partially condensed to form a B-stage resin. The resorcinol component (i.e., the hydroxyl-group-providing component) can be employed as starting material herein advantageously in the form of a partially cured or B-stage resin of phenol-resorcinol-formaldehyde. A preferred resin contains or is made from a mixture of 15-40 parts by weight phenol, 8-35 parts by weight resorcinol, and 15-35 parts by weight aqueous formaldehyde as formalin, sufficient to cure the resin to the B stage but no further, the mixture having a pH of 8.0 or greater. The new material of this invention is free of hydraulic cements and may be used in combination with fiberglass and other materials, to make better structural materials.

Resorcinol or a combination or an admixture of phenol and resorcinol may be reacted in the absence of a catalyst with various aldehydes. However, not all such reaction products are satisfactory for the purposes of this invention. For example, phenol alone cannot be used successfully commercially in combination with an equivalent amount of formaldehyde alone as resinification agent except where formed under high pressures and high temperatures.

Acetaldehyde is not stable and is considered dangerous to use in an ordinary fiberglass fabricating shop. Most other sources of aldehydes present problems of handling and use without the aid of specialized equipment and processes.

In this invention paraformaldehyde, preferably in the form of a fine powder, is employed with formaldehyde, preferably as formalin, as the aldehyde component. Paraformaldehyde has relatively easy solubility in a resorcinol-formaldehyde solution. Paraformaldehyde in amounts from about 5.5% up to about 15% preferably from 6% to 8% by weight, based on the total weight of the hydroxyl-group-component and the aldehyde component, reacts with resocinols and phenol-resorcinols in water containing formaldehyde, in the absence of high temperature and pressure, to produce a product with high temperature resistance and little or no smoke evolution during flaming or irradiated conditions. When used with unreinforced resin (made from any of the proportions described above) to make castings, coatings or the like from about 5.5% to about 6% paraformaldehyde is advantageous in order to avoid cracking or crazing; and the higher amounts within the range of 5.5 to 15% by weight, preferably 6% to 8% are useful in making reinforced products such as, for example, those containing fiberglass.

However, when used in higher amounts as the sole source of aldehyde, paraformaldehyde presents some practical drawbacks. Paraformaldehyde, when used in larger amounts than 15%, tends to produce a brittle product, which tends to crack and craze, because large voids are created during the dissipation of the water from the condensation reaction, and because the molecules become tightly linked. The end product is then weak and brittle, whether the resin is used as a plain unfilled casting, or used in combination with reinforcing fiberglass, wood flour, or other commonly used fillers. In the present invention the tendency toward cracking is reduced, when higher amounts of paraformaldehye, within the stated range, are used, by the use of fillers or fiberglass reinforcements, since less resin is used. In view of the above cautionary considerations, not over about 15% by weight of paraformaldehye is to be employed with the resin of this invention.

The percentage ratios provided above relate to the weights of various components. Resorcinol and phenol-resorcinol are solids which, to enable them to be used in liquid form, are dissolved in various organic solvents, such as formalin, alcohols, ether, or glycol. Consideration must be given to the percent solids of the resorcinol and phenol-resorcinol solutions and to the mol weights used. These materials provide the sole or major source of the hydroxyl radical which may be condensed with the formaldehyde and paraformaldehyde. The percent phenolic solids within a B-stage resin solution is a variable in and of itself. The resorcinol, whether or not extended with phenol, may vary in composition: for example, it may vary from about 10% to about 15% weight content of free phenol-radicals in solution. The proportion of phenol per se to resorcinol may also be adjusted to as low as 0% phenol. Because of these variables, the corresponding weights of the aldehyde source are widely variable within the range shown as the proportions of resorcinol, phenol, and phenol-resorcinol are changed. Sufficient total aldehyde, with suitable proportions of formaldehyde to paraformaldehyde, is used to provide a tough resin of low flame-spread and smoke-evolution characteristics when compared with red oak wood, and with satisfactory resistance to cracking and embrittlement.

DETAILED DESRIPTION OF SOME PREFERRED EMBODIEMENTS

The discussion which follows is based on a B-stage resin of resorcinol-formaldehyde or phenol-resorcinol-formaldehyde of about 10% solids (in some instances) or about 40% solids (in other instances), in solution in a suitable solvent, typically water and either methanol or ethanol. Adjustment in the aldehyde amount is dependent on the total amount of hydroxyl radicals available.

With the B-stage resin solution considered part A and the additional aldehyde source considered part B, then the amount of part B to be used is that amount which provides a substantially equivalent amount of aldehyde with respect to the hydroxyl groups available (unreacted) in part A.

Part B is made up of paraformaldehyde and formaldehyde. The paraformaldehyde is present in an amount of from 5.5% to 15% by weight of the total of parts A and B.

The initial formaldehyde, i.e., the formaldehyde of the B-staged resin, may be adjusted, within wide ranges in relation to the total phenol plus resorcinol used. It is not generally desirable to have much more than 0.70 mol formaldehyde per mol of total phenol plus resorcinol and less may be used. In a preferred composition such mol ratio is approximately 0.65/1.0.

I have discovered that when the formulation contains less than 5.5% by weight of paraformaldehyde, the end product (be it a resin casting alone or resin in combination with fiberglass or other fillers) tends not to cure, and above 15% paraformaldehyde causes excessive cracking.

I have found that no cements, fillers, halogens, antimony oxides, borons, or other common and conventionally used fire-resistive additives are necessary to achieve the results obtained by this invention. It is particularly important to note that no cement of any kind is required to influence either the viscosity of the resin system, nor to improve glass wetout, nor to absorb water generated during the condensation reaction, nor to impart any of the desired fire-resisting, low smoke-generation, and strength characteristics. While all such materials of the above may be added to the instant invention, they do not significantly influence the instant invention, and some may have deleterious effects and/or influences on the use of this synthetic resin composition, most of which have been discussed earlier.

The presence of fibrous materials, fillers which are not hydraulic cements, or of reinforcing fiberglass help to reduce the shrinkage effect of the resin, and can help to prevent cracking or crazing of the cast resin.

Paraformaldehyde is commercially available in combination with wood flour. A small percentage of this combination is not disastrous in the instant invention. However, it is preferable to use paraformaldehyde without wood flour, in order to minimize smoke generation.

The synthetic resin composition of the instant invention may be used to produce end products such as honeycomb structures for aircraft (either of the coated paper or fiberglass types), panels (whether for aircraft or residence), air ducts, electrical conduits, fire doors, fire-resistant coatings, piping, and other materials used in the construction, aircraft, transportation, marine and other fields. Conventional fiberglass fabricating equipment and/or techniques may be used in conjunction with the instant invention, to achieve any of the above products. The resin system alone or in combination with conventional non-burnable filler materials, or in combination with fiberglass mat, woven roving, chopped glass roving or filament winding roving, may be used to provide finished end products.

A mixture of chopped glass fibers and the resin of this invention can be sprayed onto flat surfaces, rotating pipes, or other configurations with the aid of special design spray-gun equipment. The resin systems of this invention will cure at room temperature, in time becoming firm. The curing of the fiberglass and resin mixture, while occurring at normal ambient air temperatures, may be further accelerated by a source of external heat. Once the parts are cured, they may be removed from their molds and will thereafter retain their shapes. Additionally, known accelerators to effect rapid cure may be added to the resin.

The material in combination with filament-winding roving may be used to wind round, oval or rectangular shapes for use in ducts, conduit, pipes or tanks. In this instance, a rotating form is used, and the glass roving wound; alternatively, the form may remain stationary, and the bobbins of glass be rotated around the form or mold. Prior to winding the roving, the winding roving is immersed in a coater or impregnator unit to wet the glass strands with the resin composition. This technique may also be used to make round, oval or rectangular elbows, tees, flanges or containers of virtually any shape or size within the capability of the individual filament winder used.

The synthetic resin composition of this invention may also be sprayed on the interior and/or exterior of revolving steel pipes, or synthetic composition pipes. When sprayed on the interior, the process is known as centrifugal casting, and when sprayed on the exterior, the process is known as coating.

Conventional and continuous pultrusion and extrusion equipment may be used for the continuous production of pipes, ducts, gutters or any shape limited only by the dies used.

Molding equipment, such as either hydraulic presses or low-pressure vacuum bags, may also be used to manufacture products using the resin system of the instant invention.

Coatings of this invention, filled or unfilled, may also be used for roofing, pipe insulation, duct insulation, and wall surfaces.

It is also feasible to foam the resins of this invention to produce a fire-resistant foam. Conventional Freon or other suitable gases may be used to form products of various densities, depending upon the gas and the types and quantities of fillers used.

When the synthetic compositions of this instant invention are used in combination of fiberglass, the resulting laminate has a temperature resistance that varies from 800° to 1500° F. depending upon the techniques used to fabricate the end product.

While I do not wish to be bound to any specific theory, I believe that resorcinol and paraformaldehyde are the basic ingredients which provide the desirable flame and heat resistivity and low smoke, and other desired end results. I believe that, essentially, the hydroxyl groups of the resorcinol combine with the paraformaldehyde in such a manner that the unusual combination of resistance to flame spread and low smoke-generation are achieved. The combination of phenol with resorcinol does not interfere with the desirable end characteristics, and formaldehyde is an essential ingredient, as already stated. The phenol-to-resorcinol ratio should not exceed five to one, and, of course, there need be no phenol. In addition the total aldehyde to total phenol-plus-resorcinol, or hydroxyl-group-providing component, should also be controlled on a mol ratio basis of 1.1 to 1.85 mols per mol of such total phenol-plus-resorcinol. From a practical point of view, the viscosity of the instant invention enhances the fabrication of fiberglass parts because of my new resin's superior ability to wet and bond to glass fibers, without the application of pressure and without the necessity of heat. However, pressure and heat may be used to reduce the reaction and cure time required, which tend to tie-up the tooling.

Thompson in U.S. Pat. No. 3,502,610 teaches that Portland cement, within a narrow range, is required to enable fabrication of fiberglass parts with resorcinol-bearing resins. I have found that such cements are not required either to influence viscosity, to achieve glass wetout, to achieve desired fire-resistant properties, or to achieve strength retention of fiberglass parts in the product and process of the present invention.

EXAMPLE 1

Sample (a-1) (Prior Art) A sample of a commercially available partially cured (B-stage) resin of resorcinol, phenol, and formaldehyde, was used as a control composition. One hundred parts of the resin (such phenol-resorcinol-formaldehyde-aqueous solution in the proportion of 2.6 parts of phenol per 12.6 parts of resorcinol, with formaldehyde sufficient to result in the B-stage and water, lower aliphatic alcohols, and glycols), and 15 parts of B (of which 12 parts are solely paraformaldehyde and 3 parts are Portland cement of the type specified in Thompson, U.S. Pat. No. 3,502,610) were mixed with a jiffey mixer. A layer of fiberglass woven roving was interspersed between two layers of fiberglass mat and the whole was saturated with the mix. With the aid of a mechanical roller air was removed from the laminate. The saturated fiberglass is then heated at a temperature and for a time sufficient to cure the resin.

Sample (a-2) was the same as the above except that only 12 parts by weight of part B was used in the mix, and no cement.

Sample (a-3) was prepared as in (a-1) above using 12 parts by weight of part B consisting solely of paraformaldehyde with 3 parts by weight to part A of an inert filler material, which is a 50—50 mixture of asbestos and fine clay. A mixture of talc and silica flour gives the same results.

Sample (b-1) A laminate similar to that of (a-1) was made except a commercially available partially cured or B-stage resin selected from the type containing 15-40 parts by weight phenol, 8-25 parts by weight resorcinol and 15-35 parts by weight formalin and being 40-60% solids, with water, and some sodium hydroxide and some lower aliphatic alcohol, generally methanol or ethanol, was mixed, with 15 parts by weight of paraformaldehyde, without any added cement or filler.

Sample (b-2) used the same formulation as in (b-1), but contained only 12 parts by weight of paraformaldehyde.

Sample (b-3) used the same formulation as (b-1) but with the addition of 3 parts by weight to part A of a filler material.

Sample (c-1) A laminate similar to (b-1) was made but with the phenol-resorcinol from a second supplier and 15 parts by weight of paraformaldehyde.

Sample (c-2) used the same resin as in (c-1) but 12 parts by weight of paraformaldehyde.

Sample (c-3) used the same resin as in (c-2) but with the addition of 3 parts by weight of a filler material.

All nine samples were heated to cure the resin, e.g., at from 80° C. to 105° C. In the above tests they were placed in an oven and cured for 1 hour at a temperature of approximately 93° C. (200° F.). Samples (a-1) each contained 3 to 4 parts by weight Portland cement and none of the (a-2), (a-3), or the (b) and (c) samples contained any cement. All were stiff, similar in nature to a polyester-fiberglass laminate. All samples of laminates as described above were forwarded to the Monsanto Research Laboratories in St. Louis and tested for flame spread in their two-foot tunnel, the results of which are contained in Table II. In addition, comparative smoke evolution studies were made using the National Bureau of Standards' chamber hereinbefore referred to. The results shown in Table II have been interpolated into equivalent results that might be anticipated in the E-84 tunnel test. To meet various building codes in common use it is important that flame spread values not exceed 25 and that smoke density values not exceed 50, as determined by the UL 723 (ASTM E-84) Tunnel Test.

TABLE I

| Test No. | Part A Parts by Weight Phenol-Resorcinol | Parts by Weight Formalin | Part B Parts by Weight Paraformaldehyde | Cement | Filler |
|---|---|---|---|---|---|
| a-1 | 2.6 | 12.6 | * | 12 | 3 | 0 |
| a-2 | 2.6 | 12.6 | * | 12 | 0 | 0 |
| a-3 | 2.6 | 12.6 | * | 12 | 0 | 3 |
| b-1 | 26 | 16 | 15-35 | 15 | 0 | 0 |
| b-2 | 26 | 16 | 15-35 | 12 | 0 | 0 |
| b-3 | 26 | 16 | 15-35 | 12 | 0 | 3 |
| c-1 | 1.8 | 8.3 | * | 15 | 0 | 0 |
| c-2 | 1.8 | 8.3 | * | 12 | 0 | 0 |
| c-3 | 1.8 | 8.3 | * | 12 | 0 | 3 |

*These are commercially available PRF formulations. Percent or parts formaldehyde not known.

TABLE II

COMPARISON ANALYSIS, MONSANTO DATA

| Test No. | Flame Spread* | Smoke Density* |
|---|---|---|
| a-1 | 10.3 | 29 |
| a-2 | 8.5 | 45 |
| a-3 | 8.5 | 37 |
| b-1 | 14.9 | 30 |
| b-2 | 11.2 | 35 |
| b-3 | 13.1 | 46 |
| c-1 | —** | 52 |
| c-2 | 6.4 | 83 |
| c-3 | 6.4 | 63 |

* Interpolated Values
** Note:c-1 value erratic and not reported

It may be noted that equivalent flame spread (or resistance to burning) is quite low, all those reported being in the vicinity of 6.4 to not over 14.9. The desired level being less than 25, these formulations easly exceed the requirements. Also, all of the (b) formulations exhibited smoke development equivalent of not over 46, where 50 is the maximum allowable; and a-2 and a-3, without cement have a lower flame spread than 1-1, and acceptable smoke density values.

EXAMPLE 2

Nine laminates similar to the above were fabricated and forwarded to Ohio State University Experiment Test Station for fire and smoke tests. These tests have no correlation to any of the other tests mentioned above, but the results may be compared from laminate to laminate as indicative of fire performance. The results of the Ohio State University tests indicate the following order of magnitude, from lowest to highest:

TABLE III

| Heat release | c - b - a |
|---|---|
| Smoke release | c - a - b |

Full scale tunnel tests (ASTM E-84) have indicated that fiberglass panels combined with the a-1 resin formulation had a flame spread of 10 and a smoke developed rating of 45. In the Ohio State University tests, the a-1 panels had the highest average heat release rate (1200 Btu per square foot), although the a-1 panels were satisfactory in smoke evolution.

TABLE IV

COMPARISON ANALYSIS OF OHIO STATE TESTS

| Test | Total Heat Release (Red OaK Value = 2800) | | |
|---|---|---|---|
|  | 1 | 2 | 3 |
| a | 1200 | 1050 | 1000 |
| b | 1050 | 700 | 1050 |
| c | no data | no data | 700 |
|  | Smoke Development (Red Oak Value = 425) | | |
| a | 400 | 440 | 685 |
| b | 925 | 575 | 180 |
| c | no data | 170 | no data |

EXAMPLE 3

A resin casting similar to formulations in Example 1 was made using no filler or reinforcing materials (except for cement in Samples a). Although samples b and c commenced to crack and disintegrate in a few days, this is avoided by reducing the amount of paraformaldehyde to about 6% and the products still exhibit the desired low smoke development and low heat release characteristics. When a propane torch was applied to the samples, for all practical purposes none of them burned nor smoked. Rather, they gave off an invisible gas which often extinguished the flame of the propane torch. I theorize that $CO_2$ is probably given off during combustion, and that the $CO_2$ functions to deprive the surface of oxygen. In addition, the heat from a flame tends only to char the surface. The char re-radiates the majority of the heat flux, thereby reducing the temperature of the surrounding area. These phenomena are also displayed with fiberglass laminates. Even when a ⅛ thick laminate is cherry red on the opposite side from the flame impingement, the panel remains cool to the touch a short distance away from the flame.

EXAMPLE 4

A resin was prepared using as part A a commercially available aqueous solution of a resorcinol-formaldehyde resin, Monsanto #RF-900 containing no phenol, and admixing therewith 8½ parts by weight of paraformaldehyde per 100 parts resin. The material was thoroughly admixed and used to saturate glass fiber layers; then baked at 180° F. (82° C.). The products were tough and the laminate did not burn or smoke when a butane torch was applied to it.

EXAMPLE 5

One hundred parts of a commercial B-staged resin formulation, Koppers G4422A consisting of a phenol-resorcinol-formaldehyde-aqueous solution and using sodium sulfite as a catalyst, was used as part A, to which 8 parts of paraformaldehyde was admixed; the admixed formulation was then used to saturate a fiberglass mat to ⅛ inch thickness and the composite cured at 180° F. for 1½ hours. When exposed to a propane torch the cured part neither burned nor smoked.

EXAMPLE 6

One hundred parts of a commercial B-staged resin formulation, Monsanto #429 consisting of a phenol-resorcinol-formaldehyde-aqueous solution and using sodium-hydroxide as a catalyst was admixed with 8 parts paraformaldehyde, the mixture used to saturate fiberglass mat and cured as in Example 5. When exposed to a propane torch, the part neither burned nor smoked.

EXAMPLE 7

A composition as in Example 6, but to which sodium sulfite, in quantities recommended by Dietrick in U.S. Pat. No. 3,328,354, was added; when cured and exposed to the flame of a propane torch as in the above examples, the part neither burned nor smoked.

The above specific description and examples have been given for purposes of illustration only and modifications and variations can be made therein without departing from the spirit and scope of the appended claims. In this specification and claims, parts and percentages are by weight unless otherwise indicated.

I claim:

1. A tough, fire-resistive resin free from hydraulic cement, exhibiting low flame spread, good heat release and low smoke evolution when exposed to direct flame or to radiant heat and being resistant to embrittlement and cracking upon curing, comprising the reaction product reacted in the presence of water of
   (a) a hydroxyl-group-providing component chosen from the group consisting of resorcinol and a mixture of resorcinol and phenol containing not over 5 mols phenol per mol resorcinol, and
   (b) an aldehyde component consisting of both formaldehyde and paraformaldehyde providing a substantially equivalent amount of aldehyde with respect to the hydroxyl groups available in said component (a), said paraformaldehyde being present in said aldehyde component in an amount of from 5.5% to 15% by weight of the total of said components (a) and (b).

2. A resin as in claim 1 containing from 6% to 8% based on the weight of the total of components (a) and (b), of paraformaldehyde.

3. Resin as in claim 1 containing 5.5% paraformaldehyde.

4. Resin as in claim 1 containing about 8% paraformaldehyde.

5. A tough, fire-resistive resin free from hydraulic cement, exhibiting low flame spread, good heat release and low smoke evolution when exposed to direct flame or to radiant heat and being resistant to embrittlement or cracking upon curing, comprising the reaction product reacted in the presence of water of (a) a B-stage resin of resorcinol, phenol, and formaldehyde, and (b) sufficient paraformaldehyde to provide a substantially equivalent amount of aldehyde with respect to the hydroxyl groups available in said component (a), the paraformaldehyde being present in an amount of from 5.5% to 15% by weight of the total of said components (a) and (b).

6. Resin as in claim 1 wherein said aldehyde component includes formaldehyde in an amount to provide a total aldehyde component in a ratio of from 1.1 to 1.85 mol thereof per mol hydroxyl-group-providing component.

7. A tough, fire-resistive resin free from hydraulic cement, exhibiting low flame spread, good heat release and low smoke evolution when exposed to direct flame or to radiant heat and being resistant to embrittlement and cracking upon curing, comprising the reaction product reacted in the presence of water of (a) a B-stage resin of resorcinol and formaldehyde, and (b) sufficient paraformaldehyde to provide a substantially equivalent amount of aldehyde with respect to the hydroxyl groups available in said component (a), said paraformaldehyde being present in an amount of 5.5% to 15% by weight based on the total weight of components (a) and (b).

8. A tough, fire-resistive resin free from hydraulic cement, exhibiting low flame spread, low heat release, and low smoke evolution when exposed to direct flame or to radiant heat and being resistant to embrittlement and cracking upon curing, comprising the reaction product of:
   (a) a hydroxy-group-providing component which is an aqueous solution of a B-stage resin containing 8 to 35 parts by weight resorcinol, 0 to 40 parts by weight phenol, and 15 to 35 parts by weight formaldehyde, and
   (b) an aldehyde component consisting of both formalin and paraformaldehyde sufficient to provide a substantially equivalent amount of aldehyde with respect to the hydroxyl groups available in said component (a), said paraformaldehyde being present in said aldehyde component in an amount of from 5.5% to 15% by weight of the total weight of said components (a) and (b).

9. Fire-resistive resin as in claim 8 wherein said paraformaldehyde is present in an amount of from 5.5% to 6% by weight.

10. Fire-resistive resin as in claim 8 wherein said paraformaldehyde is present in an amount of from 6% to 8% by weight.

11. Fire-resistive resin as in claim 8 wherein said paraformaldehyde is present in an amount of 12% by weight, and said resin contains reinforcing fiberglass.

12. Fire-resistive resin as in claim 8 wherein said paraformaldehyde is present in an amount of 15% by weight, and said resin contains reinforcing fiberglass.

13. Resin as in claim 8 wherein said phenol is present in an amount of from 15–40 parts by weight.

14. Resin as in claim 8 wherein said aldehyde component includes formalin in an amount to provide a total aldehyde component in a ratio of from 1.1 to 1.85 moles thereof per mol of said hydroxyl-group-providing component.

15. The method of making a fire-resistive resin exhibiting low flame spread, low heat release, and low smoke evolution under high temperature conditions and being resistant to cracking and embrittlement upon curing, which comprises preparing an aqueous admixture of (a) a hydroxyl-group-providing component chosen from the group consisting of resorcinol and a mixture of resorcinol and phenol containing not over 5 mols phenol per mol resorcinol, and (b) an aldehyde component consisting of formalin and paraformaldehyde, and thoroughly blending, and allowing to cure, said paraformaldehyde being present in an amount of from 5.5% to 15%, based on the total weight of said (a) and (b) components, and said formalin being present in minor amount sufficient to provide with said paraformaldehyde a substantially equivalent amount of aldehyde with respect to said hydroxy-group-providing component.

16. Method as in claim 15 wherein said aldehyde component includes formalin in an amount to provide a total aldehyde component in a ratio of from 1.1 to 1.85 mols thereof per mol of said hydroxy-group-providing component.

17. A method of making a fire-resistive resin exhibiting low flame spread, low heat release, and low smoke evolution under high temperature conditions and being resistant to cracking and embrittlement upon curing, which comprises preparing in aqueous admixture of a (a) hydroxyl-group-providing component which is a B-stage resin chosen from the group consisting of resorcinol-formaldehyde B-stage resin and phenol-resorcinol-formaldehyde B-stage resin containing not over 5 mols phenol per mol resorcinol, said B-stage resins containing not over 0.7 mol said formaldehyde per mol of said resorcinol or phenol-resorcinol, and (b) an aldehyde component consisting of both added formalin and paraformaldehyde, and thoroughly blending, and allowing to cure, said paraformaldehyde being present in an amount of from 5.5% to 15% by weight based on the total weight of said (a) and (b) components, and said added formalin being present in minor amount sufficient to provide with said paraformaldehyde a substantially equivalent amount of aldehyde with respect to said (a) component.

18. A lightweight, fire-resistive, structural material free of hydraulic cement, exhibiting low flame spread, good heat release and low smoke evolution when exposed to direct flame or to radiant heat and being resistant to embrittlement and cracking upon curing, comprising:
(1) a fire-resistive, reinforcing, permeable material embedded in
(2) a fire-resistive resin comprising the cured, reaction product of
(a) a hydroxyl-group-providing component chosen from the group consisting of resorcinol and a mixture of resorcinol and phenol containing not over 5 mols phenol per mol resorcinol, and
(b) an aldehyde component consisting of both formalin and paraformaldehyde providing a substantially equivalent amount of total aldehyde with respect to the hydroxyl groups available in said component (a), said paraformaldehyde being present in said aldehyde component in an amount of from 5.5% to 15% by weight of the total of said components (a) and (b).

19. A structural material as in claim 18 wherein said reinforcing material is fiberglass.

20. A structural material as in claim 19 wherein said reinforcing material comprises a layer of fiberglass woven roving disposed between two layers of fiberglass mat, said reinforcing material being laminated with said resin.

21. Method of making a reinforced, fire-resistive, resinous structural material free of hydraulic cement, exhibitinhg low flame spread, good heat release and low smoke evolution when exposed to direct flame or to radiant heat and being resistant to embrittlement and cracking upon curing, comprising
(1) saturating fiberglass reinforcement with a resinuous composition consisting essentially of an aqueous admixture of
(a) a hydroxy-group-providing component chosen from the group consisting of resorcinol and a mixture of resorcinol and phenol containing not over 5 mols phenol per 1 mol resorcinol, and
(b) an aldehyde component consisting of both formalin and paraformaldehyde providing a substantially equivalent amount of aldehyde with respect to said component (a), said paraformaldehyde being present in an amount of from 5.5% to 15% by weight of the total of said components (a) and (b),
(2) pressing said saturated fiberglass to remove air and excess resinous composition, and
(3) curing said fiberglass saturated with said resin at from room temperature to 105° C., to form said structural material.

22. Method as in claim 21 wherein said resinous structural material is cured at room temperature to 93° C.

* * * * *

UNITED STATES PATENT AND TRADEMARK OFFICE
CERTIFICATE OF CORRECTION

PATENT NO. : 4,107,127
DATED : August 15, 1978
INVENTOR(S) : Lawrence E. Shea

It is certified that error appears in the above-identified patent and that said Letters Patent are hereby corrected as shown below:

```
Column  2, lines 63-64, "Monsannto" should read --Monsanto--.
Column  2, line 67, "e-84" should read --E-84--.
Column  7, line 38, "use in ducts" should read --use as ducts--.
Column  8, line 53, "jiffey" should read --Jiffey--.
Column 10, line 11, "easly" should read --easily--.
Column 10, line 15, "than 1-1" should read --than a-1--.
Column 10, line 43, "Red OaK" should read --Red Oak--.
Column 11, line 4, "1/8 thick" should read --1/8" thick--.
Column 12, line 32, "flane" should read --flame--.
Column 13, line 11, "1.85 moles" should read --1.85 mols--.
Column 13, line 30, "hydroxy" should read --hydroxyl--.
Column 13, line 35, "hydroxy" should read --hydroxyl--.
Column 14, line 32, "exhibitinhg" should read --exhibiting--.
Column 14, line 39, "hydroxy" should read --hydroxyl--.
Column 14, line 56, "at room" should read --at from room--.
```

Signed and Sealed this

Twentieth Day of March 1979

[SEAL]

Attest:

RUTH C. MASON
Attesting Officer

DONALD W. BANNER
Commissioner of Patents and Trademarks